R. C. SMITH.
OSCILLATING WATER MOTOR.
APPLICATION FILED OCT. 27, 1909.
981,889.
Patented Jan. 17, 1911.
3 SHEETS—SHEET 1.
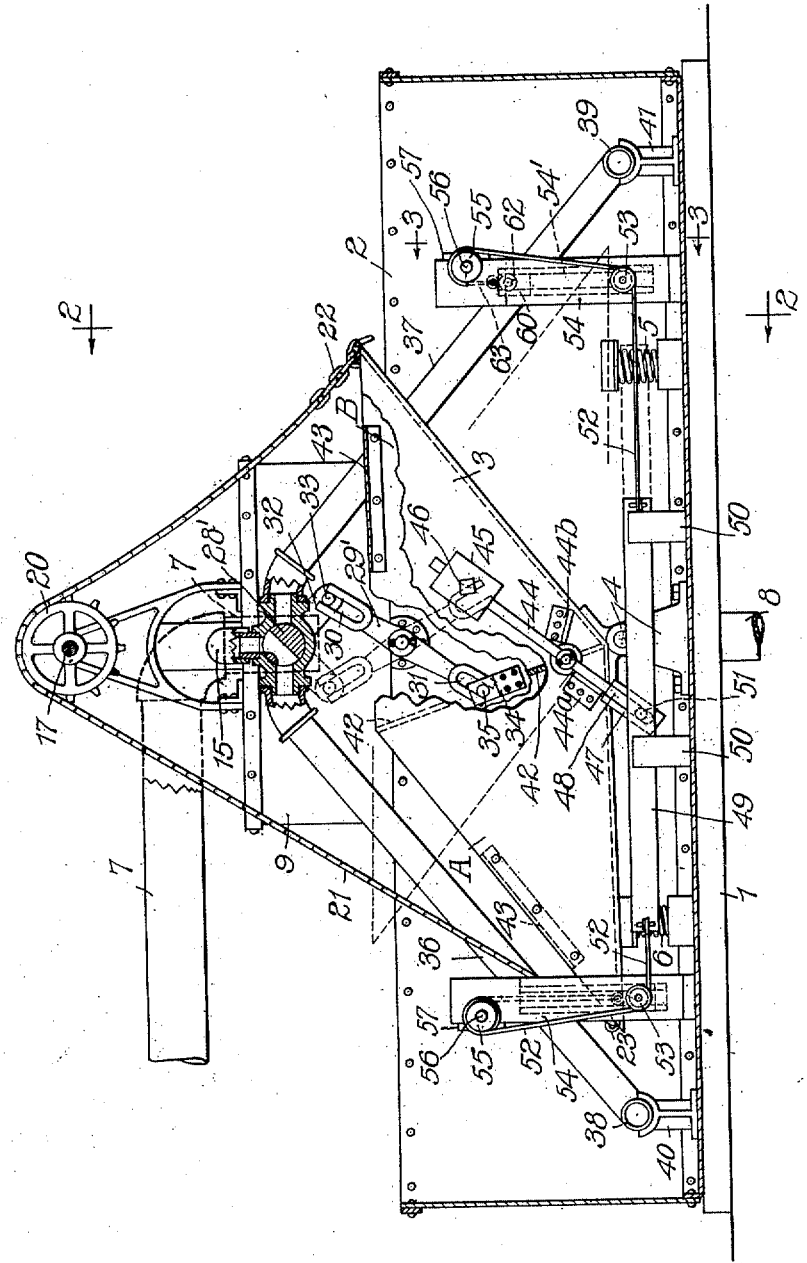
Witnesses
Leonard W. Novander
Frank J. Thelen
Inventor
Robert C. Smith
By Brown & Williams
Attorneys

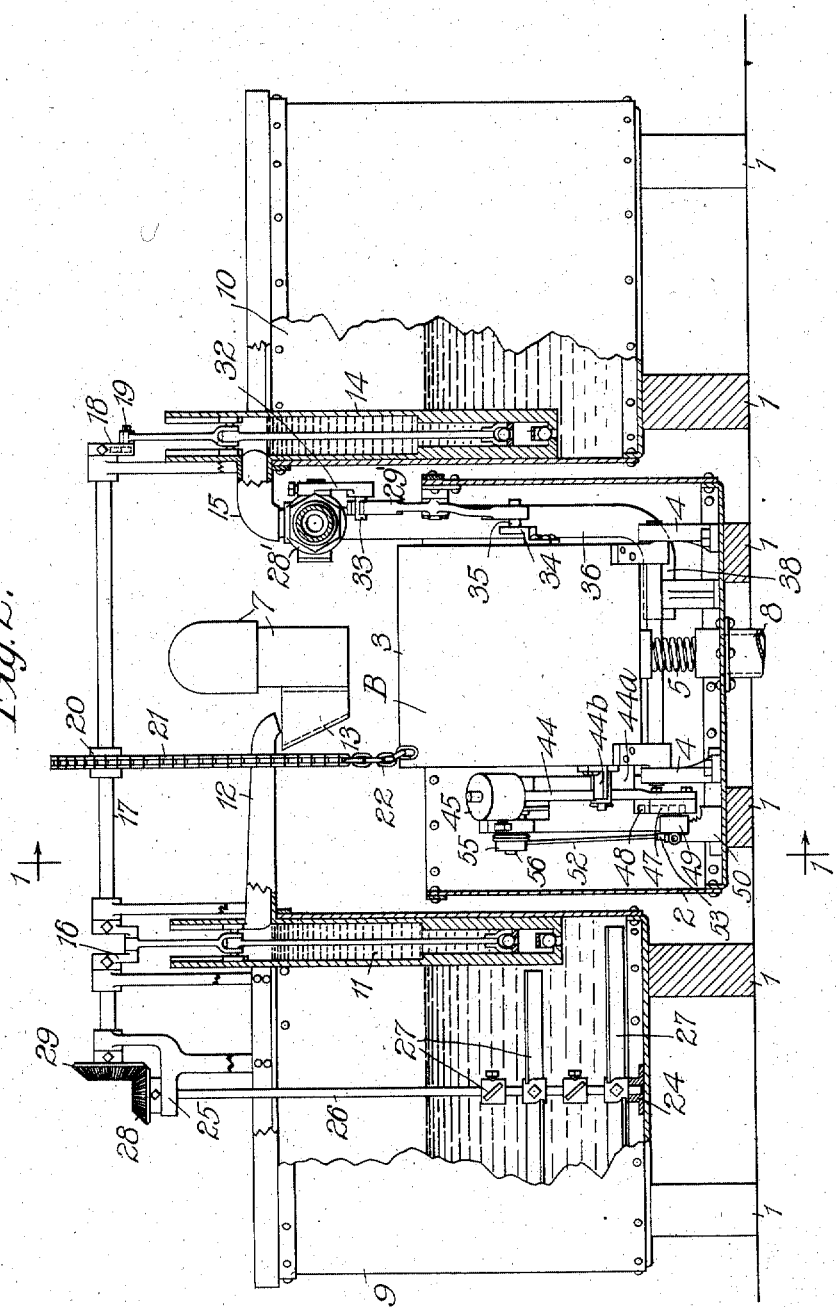

R. C. SMITH.
OSCILLATING WATER MOTOR.
APPLICATION FILED OCT. 27, 1909.
981,889.
Patented Jan. 17, 1911.
3 SHEETS—SHEET 3.
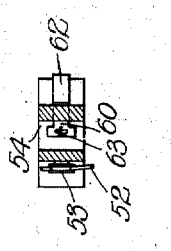
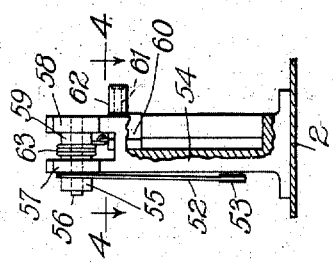

UNITED STATES PATENT OFFICE.

ROBERT C. SMITH, OF OAK PARK, ILLINOIS.

OSCILLATING WATER-MOTOR.

981,889. Specification of Letters Patent. Patented Jan. 17, 1911.

Application filed October 27, 1909. Serial No. 524,800.

*To all whom it may concern:*

Be it known that I, ROBERT C. SMITH, a citizen of the United States, residing at Oak Park, in the county of Cook and State of Illinois, have invented a certain new and Improved Oscillating Water-Motor, of which the following is a full, clear, concise, and exact description, reference being had to the accompanying drawings, forming a part of this specification.

My invention relates to an oscillating water motor device, and has for its object the provision of means for automatically counterbalancing the movable part of the device.

In Patent No. 809,585 of January 9, 1906, and Patent No. 831,247 of September 18, 1906, I have described apparatus by means of which I conduct automatically the purification of water. In the second of the above-mentioned patents apparatus is disclosed by means of which predetermined amounts of two or more chemical solutions are added to given volumes of water.

In the apparatus which is employed in my invention a tilting vessel is used which is separated into two compartments. When the water from a supply pipe has filled one of these compartments to a predetermined point the weight of the water serves to tilt the vessel, thereby discharging the water into a receiver. The movement of the tilting vessel is effective in operating two or more pumps, one of which is connected to a mixture of lime and water, and the second of which is connected with a solution of soda ash or sodium carbonate. Additional pumps may be connected with additional tanks of chemicals if so desired. Not only is the movement of the tilting vessel made to operate the above-mentioned pumps, but it also causes the paddles within the tanks containing the chemicals to be operated, thereby agitating the chemical solutions. After one compartment of the tilting vessel is filled to the point where the vessel is caused to move, it is evident that as the vessel continues to tilt, the leverage will become more and more effective, and the center of gravity will be moved farther and farther in the direction in which the water is to be discharged. The movement of the tilting vessel will therefore be constantly accelerated, although the paddles within the chemical tanks serve to a large extent as brakes on the movement of the tilting vessel. The result of the above-mentioned action is that when the tilting vessel reaches the limit of its movement it is stopped with a considerable shock or jar, with a consequent wearing on the various parts of the mechanism.

In order to effect an even movement of the tilting vessel from one of its positions to the other by which the water in one of the compartments is discharged I provide a counterbalancing weight which coöperates with the compartment of the tilting vessel which is being filled with water in starting the tilting vessel to move so that the water in said compartment will be discharged. It is evident that if this counterbalancing weight continued to coöperate with the compartment the jar which ensues when the tilting vessel reaches its lowermost position would be increased instead of diminished. However, when the tilting vessel is moved part way a sliding bar is operated, by means of which the counterbalancing weight is shifted from one position on the tilting vessel to another, so that as the discharging compartment continues to descend, the counterbalancing weight, instead of acting with this compartment, acts against it, and the compartment is thereby caused to descend more slowly, and the jar which, without the use of my invention, takes place at the termination of the movement into discharging position, is largely obviated by thus moving the center of gravity. I also provide a partial cover to be used in connection with each of the compartments in the tilting vessel, by means of which the discharge of water from these compartments is retarded to a considerable extent. The effect of this retarded action is to still further increase the evenness of operation of the mechanism. It will therefore be seen that there are two principal advantages resulting from the use of my invention: first, an even distribution of the power as the tilting vessel is moved from one of its positions to the other, and, second, the jar and shock at the end of the movement are greatly reduced.

By the more even distribution of power, more work may be effected by the tilting operation, it thereby becoming possible to use larger vessels for the storage of chemicals, larger paddle wheels to agitate the same and larger pumps to withdraw the chemical solutions from these tanks. By the use of my counterbalancing weight it is clear that the vessel will start to tilt with a less amount of water in it than would be the case if no counterbalancing weight were employed, and for this reason if the same predetermined amount of water is used to start the movement of the tilting vessel a greater resistance to the movement of the vessel may take place, this resistance being in the form of work performed. On account of this economy of power a considerable amount of space is also saved, since a given amount of work can be performed with a smaller tilting vessel.

As some of the detailed advantages of my construction I may mention the fact that the counterbalancing weight is adjustable on a lever arm, so that the tilting vessel may be caused to start its movement when any desired amount of water, within certain predetermined limits, is added to the receiving compartment. The counterbalancing weight exerts its greatest leverage at the time the tilting vessel begins to move the sliding bar which is effective in moving the counterbalancing weight into a position where its force will be exerted in an opposite direction. I prefer to pivotally mount the counterbalancing mechanism toward the lower part of the tilting vessel near the point at which the vessel itself is pivoted. In this way a given distance from the pivotal point at which the lever arm is attached to the weight itself is made more effective than is the case if the lever is pivotally connected at a higher point, where, although it is on the line separating the two compartments of the tilting vessel, it is farther from the vertical plane of the pivotal connection of the tilting vessel itself. It will be apparent from the detailed description which follows that my mechanism is simple and positive in action, and that the parts are subjected to no undue strains. These and other advantages will be more apparent by reference to the accompanying drawings, in which—

Figure 1 is a side elevation of my apparatus, said parts being shown in cross section in order to more clearly illustrate the interior construction. This figure shows the parts as seen in elevation from the plane of the line 1—1 of Fig. 2. Fig. 2 is a sectional view on the line 2—2 of Fig. 1. Fig. 3 is a sectional view on the line 3—3 of Fig. 1. Fig. 4 is a sectional view on the line 4—4 of Fig. 3. Fig. 5 is a side elevation of the tilting vessel and its associated parts, showing a modified form of connection for the actuating apparatus of the counterbalancing weight.

The apparatus shown in the drawings is frequently mounted at the top of a settling tank or reservoir, and the beams 1, 1 may be understood as resting upon the platform at the top of such a tank and supporting the apparatus of my invention. Two of the cross-beams support a discharge vat 2, in which the tilting vessel 3 is mounted to swing upon the pivotal support 4, the motion of the tilting vessel being limited by the spring stops 5 and 6. The raw water to be treated is delivered through the inlet pipe 7, the center of which is placed directly above the center of the pivotal supports 4, 4. The pipe 8 conveys the treated water from the vat 2 to the settling tank, or in such other manner as may be desired. At either side of the vat 2 there is a chemical supply tank, a mixture of lime and water being placed in the supply tank 9 and a solution of soda ash in the tank 10. A single pump is placed in each of the chemical supply tanks, the pump 11 serving to supply the mixture of lime and water from the tank 9 and delivering it to the tilting vessel 3 through the spout 12 and the hopper 13. The pump 14 pumps a solution of soda ash from the tank 10 and delivers it through the outlet 15 in a manner which will be more fully described hereafter. The pump rod of the pump 11 is connected, as shown, with a crank 16 upon a rock-shaft 17. This rock-shaft carries also a crank 18 having a T-slot whereby the position of the crank pin 19 may be varied to regulate the length of the stroke of the pump rod of the pump 14. By this means it is possible to vary the stroke of one pump relative to that of the other. The rock-shaft 17 is operated by means of a sprocket wheel 20 and a sprocket chain 21 engaging the teeth of the sprocket wheel and connected at one end by a link-chain 22 with the end of the tilting vessel 3, and at the other end is connected to the eye-bolt 23 attached to the tilting vessel 3. It is noted that, as shown in the drawings, the chain for operating the rock-shaft 17 is slack, and the amount of slack in the chain may be regulated by adjusting the link-chain 22. Suitable bars 24 and 25 carry a shaft 26, on which the stirring paddles or blades 27 are mounted. The bevel-gears 28 and 29 cause a rotation of the stirring blades whenever the rock-shaft is rotated.

Associated with the spout 15 from the pump 14 is a 3-way valve 28'. Pivotally mounted on the side of the vat 2 is an arm or lever 29' having at its ends the slots 30 and 31. Associated with the movable portion of the valve 28' is the arm 32 having the lug 33 which operates within the slot 30. A plate 34 is attached to the side of the tilting vessel 3, this plate being provided with a projecting lug 35 adapted to operate in the slot 31.

Leading from the 3-way valve 28' are the two pipes 36 and 37, which terminate in the ends or spouts 38 and 39 held by the supports 40 and 41, the spouts occupying such a position that liquid coming therefrom will be delivered to the mass of water which comes from the tilting vessel 3 when its delivering compartment is in its lower position.

The tilting vessel 3 is provided with a partition 42 which separates the tilting vessel into the compartments A and B. Each compartment is provided with a partial cover 43, the function of which is to regulate the flow of water from the compartment when said compartment is in its lower position. It is evident that this cover fulfils a very useful purpose, in that it tends to make the operation of the tilting vessel more even.

Pivotally attached to the tilting vessel 3 in the same plane with the partition 42 is the lever arm 44, on the upper end of which the counterbalancing weight 45 may be adjusted by means of the set screw 46. Attached to the lower end of the lever 44 is the member 47 provided with the groove 48. Angle irons 44ª and 44ᵇ are securely attached to the side of the tilting vessel 3 and serve as stops or detents for the lever 44 when it is swung from one position to another, as will be described hereafter. A sliding bar 49 operating within suitable grooves in the supports 50, 50 is provided with a pin 51 adapted to operate within the groove 48 of the member 47. To each end of the sliding bar 49 is attached a rope or chain 52 which passes over the sheave 53 attached to the upright support 54, after which the rope 52 passes around the roller 55, to which it is securely attached at its end. The roller 55 is rigidly mounted on the shaft 56, which in turn operates within the bearings 57 and 58. A second roller 59 between the bearings 57 and 58 is also rigidly attached to shaft 56. Operating within a groove in the upright 54 is a T-member 60 provided with an outward projecting shaft 61 on which the roller 62 is mounted. Attached to the T-member 60 is the rope or chain 63 which passes around the roller 59 and has its end securely attached thereto.

The operation of my invention may now be clearly understood. The parts being in the position shown in Fig. 1, water is introduced into compartment B through the delivery spout 7. It is evident that the counterbalancing weight 45 being in the position shown, the weight of the tilting vessel to the left of the vertical plane of the pivotal supports 4, 4 will be counterbalanced to any desired extent according to the adjustment of the weight 45 on the lever 44. As the water continues to increase in the compartment B a point will finally be reached at which the weight of the water will be sufficient to move the tilting vessel against the resistance offered by the pumps 11 and 14 and the paddle wheels 27, so that the latter will be operated and compartment B will begin to descend. This will continue until the end of compartment B of tilting vessel 3 strikes the roller 62 associated with the T-member 60 operating in the right-hand upright support 54. As compartment B of the tilting vessel 3 continues to descend, the T-member will be carried downwardly, and the rope 63 will be unwound from the roller 59, this action simultaneously winding the rope 52 on the roller 55. The effect of this action is to move the sliding bar 49 to the right, and thereby the counterbalancing weight 45 on the lever 44 is moved to the left. As sliding bar 49 moves to the right, rope 52 attached to the left-hand end of bar 49 is unwound from the roller 55, and the T-member 60 on this side is raised.

It is evident that as weight 45 is moved to the left the center of gravity of the tilting vessel is likewise moved to the left, with the result that compartment B of the tilting vessel 3 is caused to descend with less speed, and that the jar and shock occasioned by the tilting vessel striking the buffer spring 5 is greatly lessened.

It is evident that when the tilting vessel 3 is brought into the position shown in Fig. 1, the pump 11 will be operated so that a predetermined amount of the mixture of lime and water contained in the tank 9 will be delivered from spout 12 to compartment B. At the same time the 3-way valve 28' is operated by means of the lever 29', so that connection is established between spout 15 and pipe 36, and a predetermined amount of soda ash solution from tank 10 is delivered through spout 38 to the water which is flowing out of compartment A.

In Fig. 5 I show a modification of my invention in which the ropes 52 which are attached to the ends of sliding bar 49 pass over sheaves 53 and then over sheaves 64 and are then attached to the ends of the tilting vessel 3. The sheave 64 is located at such a height that the length of the rope from sheave 64 to its attachment on the tilting vessel 3 is equal to one-fourth of the distance between sheave 53 and the attachment on the tilting vessel 3. As the tilting vessel 3 moves downward it is evident that the first quarter of its movement will place the end of the tilting vessel opposite sheave 64, the second quarter will bring it into the first position shown in dotted lines in Fig. 5, and the remaining movement to the second position shown in dotted lines will move sliding bar 49 a distance equal to half of the distance between sheaves 53 and the attachment on tilting vessel 3. It is evident that no movement of sliding bar 49 takes place until the end of the tilting vessel 3 has reached the first position shown in dotted lines in Fig. 5, and when this position is reached, the other end of tilting vessel 3 has reached a corresponding position, so that as the right-hand end of tilting vessel 3 continues to descend, the left-hand end is brought into such a position that free movement of sliding bar 49 to the right is permitted.

It is evident that many changes could be made in the detailed construction of the parts disclosed in this specification without departing from the spirit of my invention.

What I claim as new and desire to cover by Letters Patent is:

1. In combination, a reciprocatingly tilting vessel for containing a fluid, and means for automatically counteracting the natural shifting of the center of gravity of the vessel.

2. In combination, a reciprocatingly tilting vessel for containing a fluid, and means actuated by the movement of the vessel for automatically counteracting the natural shifting of the center of gravity of the vessel.

3. In combination, a reciprocatingly tilting vessel having a plurality of compartments for containing fluid, and means actuated by the movement of said vessel for automatically counteracting the natural shifting of the center of gravity of the vessel.

4. In combination, a reciprocatingly tilting member, a movable counterbalancing weight attached to said member, and means actuated by the movement of said member for automatically shifting said weight.

5. In combination, a reciprocatingly tilting member, a movable counterbalancing weight attached to said member, and means actuated by the movement of said member for automatically shifting the position of said weight when the tilting member reaches a predetermined position in its reciprocating movement.

6. In combination, a reciprocatingly tilting member, a movable counterbalancing weight attached to said member, and means for automatically shifting said weight from the descending to the ascending portion of said member when the member reaches a predetermined position in its reciprocating movement.

7. In combination, a reciprocatingly tilting vessel having a plurality of compartments for containing fluid, a movable counterbalancing weight attached to said vessel, and means for automatically shifting said weight from the descending to the ascending portion of said vessel when said vessel reaches a predetermined position in its reciprocal movement.

8. In combination, a reciprocatingly tilting member, a movable counterbalancing weight pivotally attached to said member, a movable member coöperating with said weight and adapted to shift the position of the weight, thereby shifting the center of gravity of the tilting member, and means for automatically actuating the member coöperating with the weight when the tilting member reaches a predetermined position in its reciprocating movement.

9. In combination, a reciprocatingly tilting member, a movable counterbalancing weight pivotally attached to said member, a movable member coöperating with said weight and adapted to shift the position of the weight, thereby shifting the center of gravity of the tilting member, and means for automatically actuating the member coöperating with the weight when the tilting member reaches a predetermined position in its reciprocating movement, said weight thereby being shifted toward the ascending portion of the tilting member.

10. In combination, a reciprocatingly tilting member, a movable counterbalancing weight pivotally attached to said member, a sliding member coöperating with said weight and adapted to shift the position of the weight, thereby shifting the center of gravity of the tilting member, and means for automatically actuating the member coöperating with the weight when the tilting member reaches a predetermined position in its reciprocating movement, said weight thereby being shifted toward the ascending portion of the tilting member.

11. In combination, a vessel having a plurailty of compartments for receiving fluid, means for pivotally supporting said vessel at or near its central plane to allow of reciprocating tilting movement, a counterbalancing weight pivotally attached to said vessel, a movable member coöperating with and adapted to shift said weight, and means for automatically actuating said movable member by the tilting of the vessel, thereby shifting said weight when the vessel reaches a predetermined position in its movement.

12. In combination, a vessel having a plurality of compartments for receiving fluid, means for pivotally supporting said vessel at or near its central plane to allow of reciprocating tilting movement, a counterbalancing weight pivotally attached to said vessel, a movable member coöperating with and adapted to shift said weight, and means for automatically actuating said movable member by the tilting of the vessel, thereby shifting said weight toward the ascending portion of said vessel when the descending portion reaches a predetermined position in its movement.

13. In combination, a vessel having a plurality of compartments for receiving fluid, means for pivotally supporting said vessel at or near its central plane to allow a reciprocatingly tilting movement, a counterbalancing weight pivotally attached to said vessel, a sliding member coöperating with and adapted to shift said weight, and means for automatically actuating said sliding member by the tilting of the vessel, thereby shifting said weight when the vessel reaches a predetermined position in its tilting movement.

14. In a device of the class described, the combination of a vessel having a pair of compartments adapted to receive fluid, means for pivotally supporting said vessel substantially in the plane separating said compartments, means for limiting the tilting movement of said vessel on said pivotal support, means for delivering fluid to the compartment in the upper position, the weight of said fluid being adapted to tilt said compartment to the lower position at which said fluid is delivered from said compartment and to move the second compartment into a position to receive said fluid, a counterbalancing weight movably attached to said tilting vessel, and means for automatically shifting said weight to the compartment in the upper position.

15. In a device of the class described, the combination of a vessel having a pair of compartments adapted to receive fluid, means for pivotally supporting said vessel substantially in the plane separating said compartments, means for limiting the tilting movement of said vessel on said pivotal support, means for delivering fluid to the compartment in the upper position, the weight of said fluid being adapted to tilt said compartment to the lower position at which said fluid is delivered from said compartment and to move the second compartment into a position to receive said fluid, a counterbalancing weight pivotally attached to said vessel, a movable member coöperating with said weight, and means for actuating said movable member by the tilting of said vessel, thereby automatically shifting said weight to the compartment in the upper position when said tilting vessel reaches a predetermined position in its tilting movement.

16. In a device of the class described, the combination of a vessel having a pair of compartments adapted to receive fluid, means for pivotally supporting said vessel substantially in the plane separating said compartments, means for limiting the tilting movement of said vessel on said pivotal support, means for delivering fluid to the compartment in the upper position, the weight of said fluid being adapted to tilt said compartment to the lower position at which said fluid is delivered from said compartment and to move the second compartment into a position to receive said fluid, a lever pivotally attached to said vessel, a counterbalancing weight adjustably mounted on said lever, detents attached to said vessel to limit the motion of said lever, and means actuated by the movement of said vessel for automatically shifting said lever to move the center of gravity of said vessel toward the compartment which is ascending when the descending compartment reaches a predetermined position.

17. In a water-softening device, the combination of a vessel having a pair of compartments adapted to receive water, means for pivotally supporting said vessel substantially in the plane separating said compartments, means for limiting the tilting movement of said vessel on said pivotal support, means for delivering fluid to the compartment in the upper position, the weight of said fluid being adapted to tilt said compartment to the lower position in which water is delivered from said compartment and to move the second compartment into a position to receive water, means associated with each compartment for restricting the outflow of water from the compartment in its lowered position, a lever pivotally attached to said vessel, a counterbalancing weight adjustably mounted on said lever, detents attached to said vessel to limit the motion of said lever, a sliding bar adapted to shift the position of said lever, and means for automatically actuating said sliding bar by the movement of said tilting vessel when said vessel reaches a predetermined position in its tilting movement, thereby shifting said counterbalancing weight and the center of gravity of the tilting vessel toward the ascending compartment.

18. In combination, an oscillating vessel, and means for automatically counteracting the natural shifting of the center of gravity of the vessel.

19. In combination, a tilting vessel, a counterbalancing weight pivotally attached to said vessel, means for limiting the oscillatory movement of said weight, and means for shifting said weight from side to side in opposition to the tilting of the vessel.

In witness whereof, I hereunto subscribe my name this 23rd day of October, A. D., 1909.

ROBERT C. SMITH.

Witnesses:
HENRY M. HUXLEY,
LEONARD W. NOVANDER.